M. DRANE.
DIRECTION SIGNAL DEVICE FOR VEHICLES.
APPLICATION FILED DEC. 23, 1916.
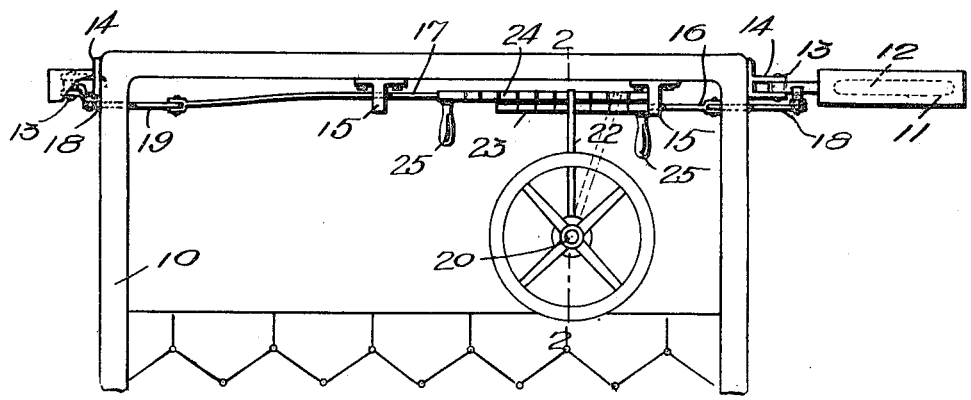
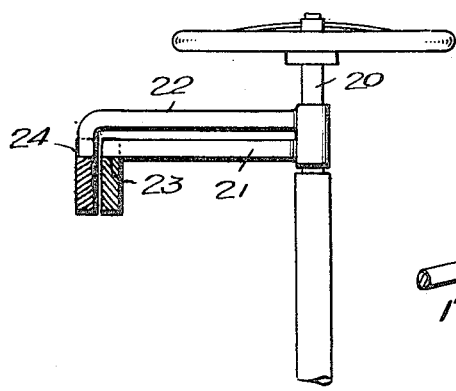
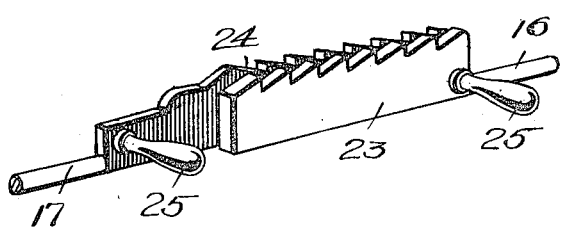
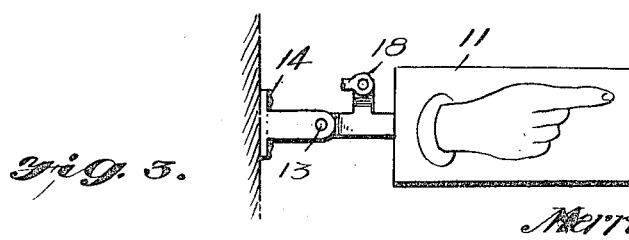
Inventor
Merritt Drane
By Max A Schmidt
Attorney

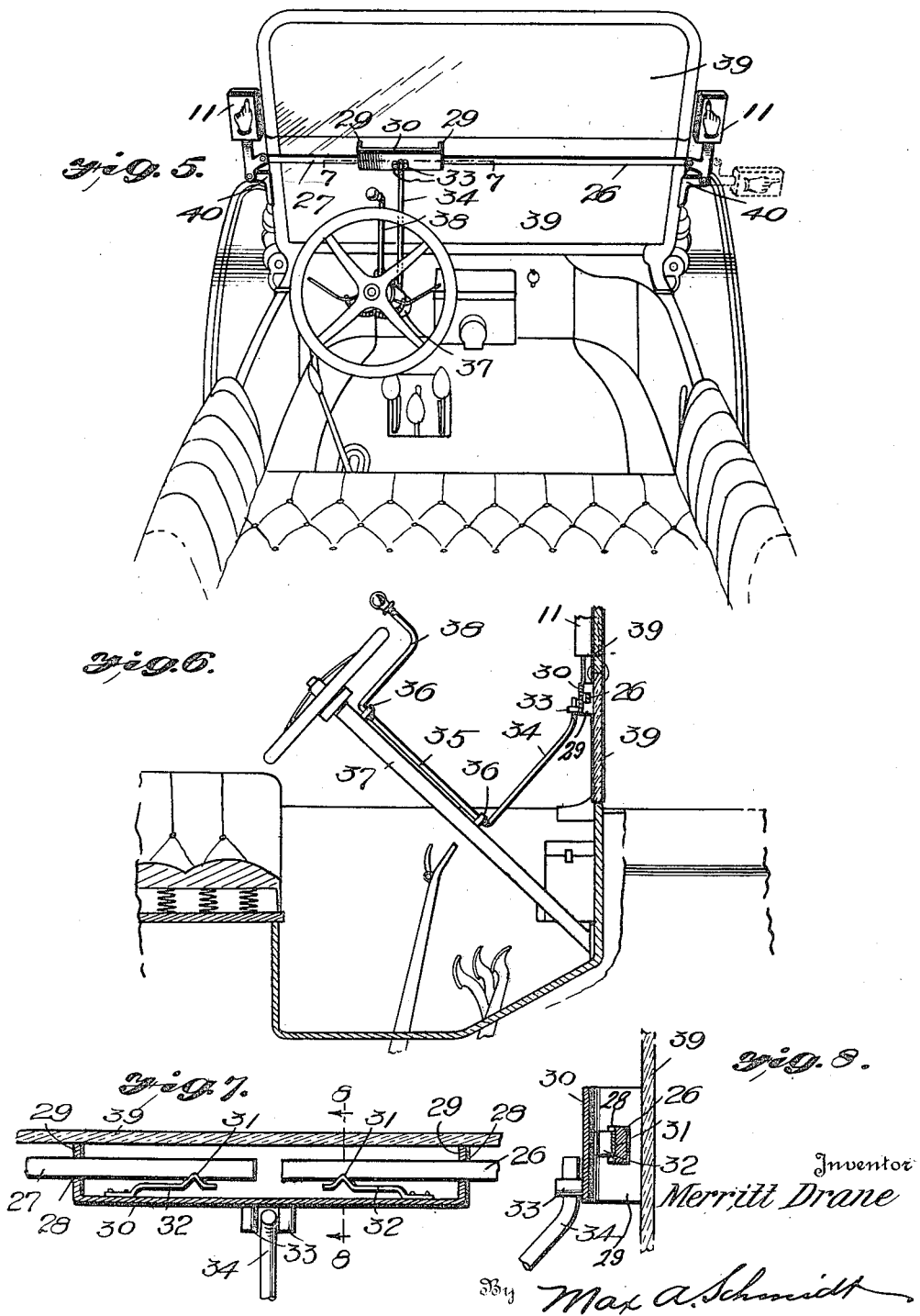

UNITED STATES PATENT OFFICE.

MERRITT DRANE, OF LOUISVILLE, KENTUCKY.

DIRECTION-SIGNAL DEVICE FOR VEHICLES.

1,262,027.

Specification of Letters Patent.

Patented Apr. 9, 1918.

Application filed December 23, 1916. Serial No. 138,606.

*To all whom it may concern:*

Be it known that I, MERRITT DRANE, a citizen of the United States, residing at Louisville, in the county of Jefferson and State of Kentucky, have invented certain new and useful Improvements in Direction-Signal Devices for Vehicles, of which the following is a specification.

This invention relates to signal devices employed in connection with motor vehicles to indicate the fact that the driver is about to make a turn, and also the direction in which the turn is to be made, thereby giving notice of the intention of the driver of the car.

The invention has for its object to provide a novel and improved signal device of the kind stated which is efficient in operation and easily controlled, and by the use of which it is not necessary for the driver to extend one arm outward from the car when a turn or stop is about to be made, as is the usual practice, the device being also operative after dark.

The object stated is attained by means of a combination and arrangement of parts to be hereinafter described and claimed, and in order that the same may be better understood, reference is had to the accompanying drawings forming a part of this specification.

In the drawings—

Figure 1 is a plan view of a fragment of an automobile, showing the application of the invention;

Fig. 2 is a cross-section on the line 2—2 of Fig. 1;

Fig. 3 is an elevation of an indicator;

Fig. 4 is a detail in perspective;

Fig. 5 is a perspective view showing another embodiment of the invention;

Fig. 6 is a side elevation thereof, partly in section;

Fig. 7 is an enlarged section on the line 7—7 of Fig. 5, and

Fig. 8 is a cross-section on the line 8—8 of Fig. 7.

Referring specifically to the drawings, 10 denotes a fragment of the front of the body of an automobile or other motor vehicle. On each side of the body is mounted a pivoted visual signal member or indicator 11 which is in the form of a casing inclosing an electric or other lamp 12 so that the signal may be observed after dark, and also having on its front and rear faces the representation of a hand. The indicator is pivoted at 13 to a suitable bracket 14 mounted on the side of the car body at the front end thereof, and it swings in a vertical plane. Normally, the indicator rests in upright position alongside the car body, and when the signal is to be given, it is swung down into horizontal position to extend straight outward from the car. As each side of the car is equipped with one of the indicators, the direction in which the car is to make a turn will be indicated by projecting the indicator on that side of the car toward which the turn is to be made.

The following means are provided for controlling the indicators:

In suitable guides 15 mounted on the front wall of the car body 10, inside the car, are two horizontally positioned slidable rods or bars 16 and 17, respectively. The rod 16 has connected to its outer end a link 18 which passes through an aperture in one of the side walls of the car body and is connected to the indicator 11 on that side of the car. The rod 17 is connected by a link 19 to the indicator 11 on the other side of the car. The connections between the rods and the indicators are such, that when the rods are slid in one direction, the indicators are swung into display position, and when the rods are slid in the opposite direction, they are swung upward into inoperative upright position alongside the car.

The rods 16 and 17 are operated manually, and also by means of a connection with the steering shaft 20 of the car. On this shaft are fixed two resilient fingers 21 and 22, respectively, which extend radially from the shaft. On the rod 16 is a rack 23 which is engaged by the spring finger 21, and the rod 17 has a rack 24 which is engaged by the spring finger 22. The racks are on the inner ends of the rods 16 and 17, and said ends of the rods lap and are parallel. The inner ends of the rods are also fitted with handles 25 within easy reach of the driver.

The teeth of the respective racks 23 and 24 are inclined in opposite directions, the arrangement being such that when the rod 16 is moved to the right, the finger 21 slips over its rack 23, whereas when the rod 17 is moved to the left, the finger 22 slips over its rack 24. The rod 16 is connected to the indicator 11 on the right hand side of the car, and the rod 17 is connected to the indicator 11 on the left hand side of the car. The two indicators are set in display position by sliding the proper rod. When this is done, assuming that the right hand indicator is to be set, the spring finger 21 trails over the rack 23, and when the steering wheel is turned the spring finger also slips over the rack. The spring finger 22 is also forced over the rack 24 and along the same. The movement of the rod 16 toward the right has swung the selected indicator 11 outward into display position, the rod 16 being moved manually by means of its handle 25. Now, when the steering wheel is turned back to the left to steer the car straight forward after the turn has been made, the spring finger 21 catches on the rack 23 and the rod 16 is drawn inward to swing the set indicator back to inoperative position. If the rod is moved farther than necessary to restore the indicator to normal position, no damage will result as the spring finger will be forced over the rack. The operation of the indicator on the other side of the car is the same as that just described.

Referring now to Figs. 5 to 8, which illustrate another embodiment of the invention, the two indicators or signal members 11 are mounted on the sides of the car and are connected to longitudinally slidable rods 26 and 27, respectively. These rods are in longitudinal alinement, and their inner ends are spaced slightly and pass loosely through apertures 28 in the downturned end flanges 29 of a slide 30. Beneath the slide, the rods have notches 31 in which seat the free ends of the flat springs 32 fixed to the under side of the slide 30.

On the slide 30 are two spaced lugs or ears 33 between which seats loosely an arm 34 extending laterally from a rock shaft 35 supported in bearings 36 carried by the tube 37 of the steering shaft, and having a crank handle 38. It will therefore be seen that the slide is moved to the right or to the left by turning the shaft 35 in a corresponding direction. The indicators 11 are normally in erect position, and when they are to be displayed, they are swung downward into horizontal position, to extend straight out from the side of the car. The indicators are so positioned that they come against the edge of the windshield 39 of the car when they are turned up into normal erect position, they being suitably mounted on the ends of the windshield by brackets 40 to which they are pivoted. The rods 26 and 27 and the parts carried thereby are located back of the windshield.

Assuming that the indicator 11 to the right is to be set, the rock shaft 35 will be operated to move the slide 30 in a corresponding direction. As the rod 26 is coupled to the slide by the spring finger 32, said rod moves with the slide and swings the indicator down to display position. The force required is not sufficient to cause the spring finger to slip out of the notch 31 and break the connection between the slide and the rod. However, the connection between the rod 27 and the slide is broken by its spring riding out of the notch and slipping along the blank edge of said rod, this release taking place because the indicator at the left engages the edge of the windshield and prevents the rod 27 from moving to the right with the rod 26. To restore the right indicator to normal position, the slide is moved to the left, whereupon the rod 26 is drawn in a corresponding direction and swings the indicator upward back against the edge of the windshield, and when the spring finger of the rod 27 reaches the notch of the latter, the slide is again coupled to said rod so that the left indicator may now be operated, the parts for operating the right indicator being, of course, also in position for again actuating the same.

If the handle 38 is moved rapidly to and fro its full travel, the two indicators 11 can be made to vibrate and thus give warning that the driver is about to stop or start the car.

While the preferred embodiments of the invention have been shown, it will be evident that various changes and modifications may be made without departure from the spirit and scope of the invention as claimed hereinafter.

I claim:

1. A direction signal for motor vehicles, comprising signal members pivotally mounted at the sides of the vehicle and adapted to be swung to project outward therefrom, longitudinally slidable members operatively connected respectively to the signal members for actuating the same, and actuators for the slidable members movable in the direction of the length thereof, and having yielding connections therewith, the connections being alternately broken when the actuators are moved in opposite directions.

2. A direction signal for motor vehicles, comprising signal members pivotally mounted at the sides of the vehicle and adapted to be swung to project outward therefrom, longitudinally slidable members operatively connected respectively to the signal members for actuating the same, a coupling member between the slidable members movable in the direction of the length thereof and having yieldable connections with said members, the connections being alternately broken when the coupling member is moved in opposite directions, and an actuator for the connecting member.

3. A direction signal for motor vehicles, comprising signal members pivotally mounted at the sides of the vehicle and adapted to be swung to project outward therefrom, longitudinally slidable members operatively connected to the signal members for actuating the same, a connecting member between the slidable members, said member having resilient fingers and the movable member having recesses into which said fingers extend, the fingers moving out of the recesses alternately when the connecting member is moved in opposite directions, and an actuator for the connecting member.

4. A direction signal for motor vehicles, comprising signal members pivotally mounted at the sides of the vehicle and adapted to be swung to project outward therefrom, longitudinally slidable members operatively connected to the signal members for actuating the same, a connecting member between the slidable members and having yieldable connections with said members, the connections being alternately broken when the connecting member is moved in opposite directions, an actuator for the connecting member, and stops for limiting the swing of the signal members into inoperative position.

5. A direction signal for motor vehicles, comprising signal members pivotally mounted at the sides of the vehicles and adapted to be swung to project outward therefrom, longitudinally slidable members operatively connected to the signal members for actuating the same, a connecting member between the slidable members and having yieldable connections with said members, the connections being alternately broken when the connecting member is moved in opposite directions, an actuator for the connecting member, and stops for limiting the swing of the signal members into inoperative position, the normal position of the signal members being erect and their swing to display position being downward.

In testimony whereof I affix my signature in the presence of two witnesses.

MERRITT DRANE.

Witnesses:
 ALEXANDER C. SCHUMAN,
 GEO. E. SCHUMAN.